UNITED STATES PATENT OFFICE.

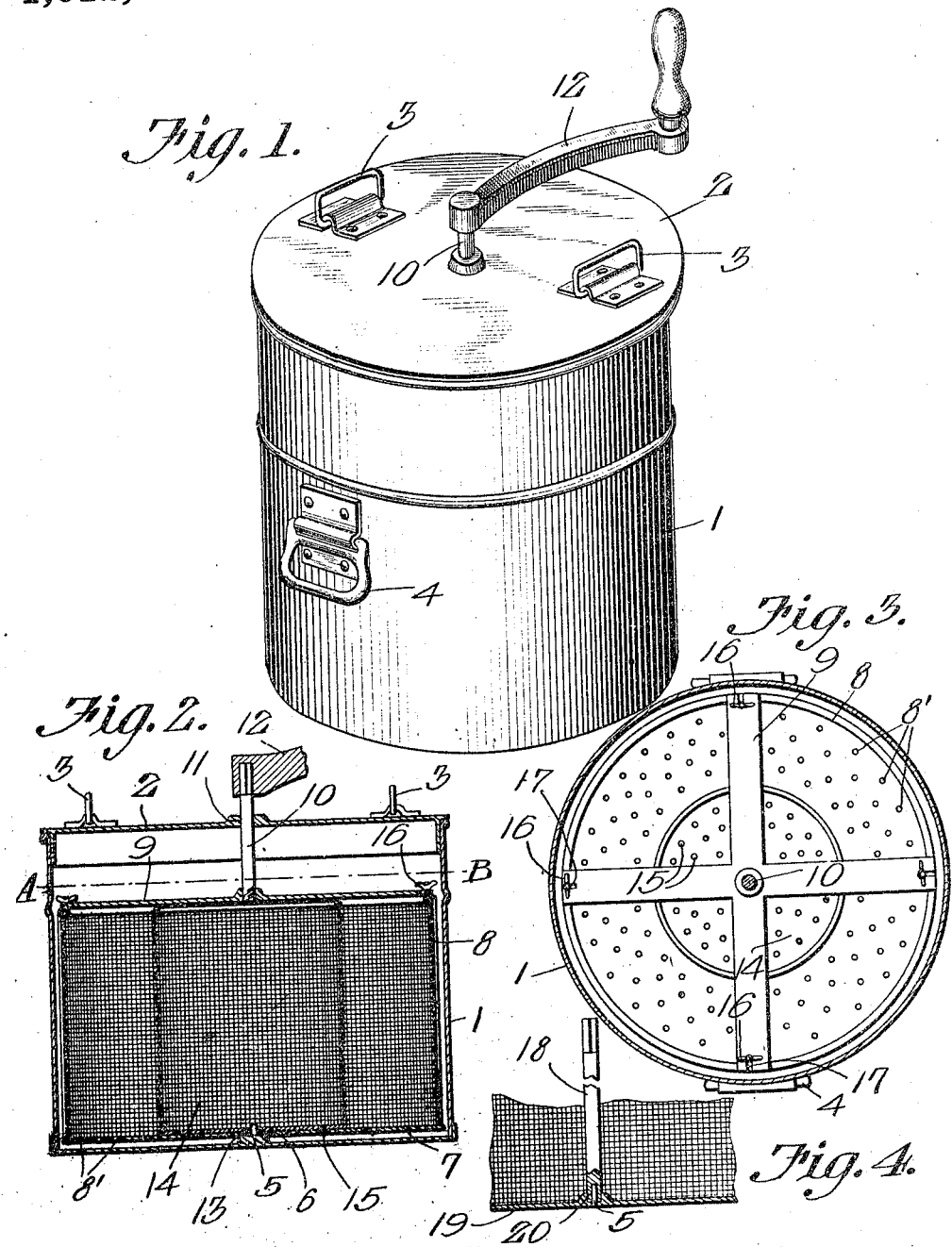

ROSE U. BRYANT, OF MONTEREY COUNTY, CALIFORNIA.

DISH-WASHER.

1,012,804.   Specification of Letters Patent.   Patented Dec. 26, 1911.

Application filed June 19, 1911. Serial No. 633,974.

*To all whom it may concern:*

Be it known that I, ROSE U. BRYANT, a citizen of the United States, residing in the county of Monterey and State of California, have invented a new and useful Dish-Washer, of which the following is a specification.

This invention relates to apparatus for washing dishes, one of its objects being to provide a simple and durable device of this type having concentric receptacles mounted to rotate simultaneously within a liquid container, one of the receptacles constituting a holder for frail china and the like whereby it is protected from injury by heavy and larger articles contained within the other receptacle.

Another object is to provide a device of this character which can be placed on a stove so that the water within the container can be kept hot during the cleaning operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred forms of the invention have been shown.

In said drawings:—Figure 1 is a perspective view of the apparatus. Fig. 2 is a central vertical section therethrough. Fig. 3 is a section on line A—B Fig. 2. Fig. 4 is a section through the bottom portion of a modified form of device.

Referring to the figures by characters of reference 1 designates a receptacle, preferably cylindrical, and having a removable cover 2 provided with handles 3 whereby the same can be readily placed in or removed from position, there also being handles 4 connected to the receptacle 1 at diametrically opposed points. A bearing stud 5 is arranged upon the bottom of the receptacle at the center thereof and is adapted to project through an opening 6 in the center of the bottom 7 of a basket 8. This basket is preferably cylindrical and is adapted to rotate within the receptacle 1, the bottom 7 of the basket being formed with a number of apertures 8' while the wall of the receptacle is preferably made up of a metal fabric. One or more cross strips 9 are secured to the top of and extend diametrically across the basket and a stem 10 is secured to the centers of the cross strips and extends upwardly through an opening 11 formed in the center of the top 2. A crank 12 may be attached to the upper end of the stem whereby the basket 7 can be readily rotated.

Stud 5 projects into an opening 13 formed in the center of the bottom of an inner basket 14, said last mentioned basket being also preferably cylindrical and concentric with the basket 7. The said basket 14 rests on the bottom of the basket 7 and the top thereof fits snugly against the cross bar or bars 9. The bottom of basket 14 has apertures 15 therein adapted to register with the apertures in the bottom of the basket 7 and the wall of the inner basket 14 is preferably formed of a metal fabric.

In using the apparatus the same is partly filled with cleansing fluid and the heavier dishes or glasses to be washed are placed in the outer basket 7 while the more delicate articles are placed in the inner basket 14. Cover 2 is then placed on the receptacle 1 and said receptacle placed on a stove so that the cleansing fluid can be maintained at a high temperature. When the crank 12 is rotated, the baskets are moved therewith and the liquid contents of the receptacle are thus thoroughly agitated and dashed against the articles to be cleaned, thus thoroughly cleaning them. The cross bar or bars 9 may be detachably secured to the basket 7 in any suitable manner, as by means of bolts 16 extending upwardly from the basket and through slots 17 in the cross strips, these bolts carrying a wing nut or the like. By removing the cover 2 and the cross strips 9, basket 14 can be readily taken out of the basket 7 and the entire basket filled with articles to be cleaned, if so desired.

Instead of utilizing the cross strip or strips 9, a rod or stem 18 may be extended upwardly from the center of the bottom of the basket 19, as indicated in Fig. 4, this stem also constituting means for centering the inner basket within the outer basket and being adapted to be engaged at its upper end by the crank 12. Where a central rod or stem 18 is utilized, the lower end thereof is formed with a recess 20 for the reception of the centering stud 5.

What is claimed is:—

Washing apparatus including a receptacle, a bearing stud upstanding from the center of the bottom thereof, a cylindrical basket having an opening in the bottom thereof for the reception of the stud, there being openings in the wall and bottom of the basket, an inner basket removably mounted within the first mentioned basket and having an opening in the center of the bottom thereof for the reception of the stud, there being openings in the wall and bottom of the inner basket, cross members detachably engaging the wall of the outer basket and constituting means for holding the inner basket in engagement with the stud, and means extending from said cross members for rotating the baskets.

In testimony that I claim the foregoing as my own, I have hereto affixed my signature in the presence of two witnesses.

ROSE U. BRYANT.

Witnesses:
SAMSON HUMPHRY,
ANGELINA B. HUMPHRY.